United States Patent
Chen

(10) Patent No.: US 11,781,046 B2
(45) Date of Patent: Oct. 10, 2023

(54) (METH)ACRYLATE ADHESIVE COMPOSITION

(71) Applicant: BenQ Materials Corporation, Taoyuan (TW)

(72) Inventor: Wen-Chun Chen, Taoyuan (TW)

(73) Assignee: BenQ Materials Corporation, Taoyuan (TW)

(*) Notice: Subject to any disclaimer, the term of this patent is extended or adjusted under 35 U.S.C. 154(b) by 51 days.

(21) Appl. No.: 17/701,755

(22) Filed: Mar. 23, 2022

(65) Prior Publication Data

US 2023/0123272 A1    Apr. 20, 2023

(30) Foreign Application Priority Data

Oct. 18, 2021  (TW) ................... 110138516

(51) Int. Cl.
| | |
|---|---|
| C08F 220/20 | (2006.01) |
| C09J 133/08 | (2006.01) |
| C09J 133/10 | (2006.01) |
| C08F 230/08 | (2006.01) |
| C08F 220/06 | (2006.01) |
| C08F 220/18 | (2006.01) |
| C08F 220/30 | (2006.01) |
| C08F 220/14 | (2006.01) |

(52) U.S. Cl.
CPC ......... *C09J 133/08* (2013.01); *C08F 220/06* (2013.01); *C08F 220/14* (2013.01); *C08F 220/1804* (2020.02); *C08F 220/20* (2013.01); *C08F 220/301* (2020.02); *C08F 230/085* (2020.02); *C09J 133/10* (2013.01); *C09J 2203/318* (2013.01); *C09J 2433/00* (2013.01)

(58) Field of Classification Search
CPC ...... C09J 133/08; C09J 133/10; C09J 143/04; C09J 133/14; C08F 220/20; C08F 230/085

See application file for complete search history.

(56) References Cited

U.S. PATENT DOCUMENTS

| | | | | |
|---|---|---|---|---|
| 5,908,669 A | * | 6/1999 | Hayashi ............... | C09D 143/04 524/521 |
| 2021/0054228 A1 | * | 2/2021 | Nakabayashi ....... | C09D 175/04 |

FOREIGN PATENT DOCUMENTS

| | | | |
|---|---|---|---|
| CN | 113045997 | * | 6/2021 |
| JP | S63291969 A | | 11/1988 |
| JP | H02123182 A | | 5/1990 |
| JP | 2021143286 A | | 9/2021 |
| TW | 200909893 A | | 3/2009 |

OTHER PUBLICATIONS

Translation of CN 113045997 (Year: 2021).*

* cited by examiner

*Primary Examiner* — Robert C Boyle

(57) ABSTRACT

The disclosure relates to a (meth)acrylate adhesive composition comprising a (meth)acrylate polymer, a cross-linking agent and a reactive siloxane copolymer with the acid value of the (meth)acrylate polymer is between 0 and 15 mgKOH/g, and the reactive siloxane copolymer derived from the copolymerization of a silane compound represented by the formula: $X—R^1—SiR^2{}_{3-a}(OR^3)_a$ (I), a non-hydroxyl acrylate monomer containing $C_1$-$C_4$ alkyl group and a hydroxyl (meth)acrylate monomer, wherein the use amount of the reactive siloxane copolymer is between 0.1 parts to 6 parts by weight per hundred parts by weight of the (meth)acrylate polymer, wherein X is an acryl group or a (methyl)acryloxy group, $R^1$ is a $C_1$-$C_4$ alkyl group or alkoxy group, $R^2$ and $R^3$ respectively are $C_1$-$C_4$ alkyl group, and a is an integer between 1 to 3. The present (meth)acrylate adhesive composition can provide an enhanced adhesion and weather resistance, also an enhanced stability over time and storage stability, when be used in polarizer bonding, can show a satisfied adhesion reliability and a proper rework ability.

12 Claims, No Drawings

(METH)ACRYLATE ADHESIVE COMPOSITION

CROSS-REFERENCE TO RELATED APPLICATION

This application claims the priority benefit of Taiwanese Application Serial Number 110138516, filed on Oct. 18, 2021, which is incorporated herein by reference.

TECHNICAL FILED

The present invention relates to a (meth)acrylate adhesive composition for a polarizer, and more particularly to a (meth)acrylate adhesive composition with enhanced adhesion and weather resistance, and stability of adhesion over time and storage stability.

BACKGROUND OF THE INVENTION

Recently, the image display devices have been widely used in various fields, such as household displays, portable or wearable electronic products, automobile or aviation instrument panels, and large information display panels.

A polarizer used in an image display device generally has an adhesive layer on the surface for bonding to the substrate of the display panel. As the application field of end products increases, the requirements of the adhesive layer are diverse with the use conditions, such as the weather resistance will be demanded when used at outdoor, or the rework ability may be required when the products are manufactured in a more complicated way. However, because the (meth)acrylate adhesive composition is commonly used as the adhesive layer of a polarizer, the initial peel strength of adhesive layer may change during storage time, therefore the adhesive composition is unable to be fairly used in the bonding process of the polarizer. Moreover, the peel strength after bonding may rise up intensely or excessively decline resulting from external factors such as fast cross-linking reaction or the inter reaction between the adhesive layer and the substrate, the rework ability may accordingly decrease or the bonding may fail. Thus, the adhesive composition is failed to provide a desired stability of adhesion over time and storage stability.

In the state of related art, adding silane-based compounds to adhesive compositions of the adhesive layer are widely proposed to increase the adhesion and the weather resistance. However, because the polarity difference between the silane-based compounds and the (meth)acrylate adhesive composition results in the poor compatibility thereof, the silane-based compound may move to the adhesive layer surface during storage or move to the interface of the adhesive layer with the bonding substrate to cause the decrease of the initial peel strength and the adhesion strength of the adhesive layer Thus, the addition of the silane-based compounds to the adhesion composition may decrease the stability over time and storage stability.

The present invention is to provide a (meth)acrylate adhesive composition for a polarizer having enhanced adhesion and weather resistance, also the enhanced stability over time and storage stability.

SUMMARY OF THE INVENTION

The present invention is to provide a (meth)acrylate adhesive composition for a polarizer, comprising a (meth) acrylate polymer, a cross-linking agent and a reactive siloxane copolymer, wherein the acid value of the (meth) acrylate polymer is between 0 and 15 mg KOH/g, and the reactive siloxane copolymer is derived from the copolymerization of a silane compound represented by the following formula (I), a non-hydroxyl acrylate monomer containing $C_1$-$C_4$ alkyl group and a hydroxyl (meth)acrylate monomer and the use amount of the reactive siloxane copolymer is between 0.1 parts to 6 parts by weight per hundred parts by weight of the (meth)acrylate polymer:

$$X—R^1—SiR^2{}_{3-a}(OR^3)_a \qquad (I)$$

wherein X is an acryl group or a (methyl)acryloxy group, $R^1$ is a $C_1$-$C_8$ alkyl group or alkoxy group, $R^2$ and $R^3$ respectively are $C_1$-$C_4$ alkyl groups, and a is an integer between 1 to 3.

In an embodiment of the (meth)acrylate adhesive composition of the present invention, the reactive siloxane copolymer is derived from a copolymerization of 5 to 30 parts by weight of a silane compound represented by the formula: $X—R^1—SiR^2{}_{3-a}(OR^3)_a$ (I), 80 to 120 parts by weight of a non-hydroxyl acrylate monomer containing $C_1$-$C_4$ alkyl group and 0.2 to 6 parts by weight of a hydroxyl (meth)acrylate monomer.

In an embodiment of the (meth)acrylate adhesive composition of the present invention, the reactive siloxane copolymer is derived from a copolymerization of 10 to 25 parts by weight of a silane compound represented by the formula: $X—R^1—SiR^2{}_{3-a}(OR^3)_a$ (I), 90 to 110 parts by weight of a non-hydroxyl acrylate monomer containing $C_1$-$C_4$ alkyl group and 0.5 to 5 parts by weight of a hydroxyl (meth)acrylate monomer.

In an embodiment of the (meth)acrylate adhesive composition of the present invention, the hydroxyl (meth)acrylate monomer can be selected from one of the group consisting of 2-hydroxyethyl methacrylate, 2-hydroxyethyl acrylate and 4-hydroxybutyl acrylate, or combinations thereof.

In an embodiment of the (meth)acrylate adhesive composition of the present invention, the non-hydroxyl acrylate monomer containing $C_1$-$C_4$ alkyl group comprises a butyl acrylate monomer and an acrylate monomer selected from one of the group consisting of methyl acrylate, ethyl acrylate and propyl acrylate, wherein the ratio of the amount of the butyl acrylate monomer to the acrylate monomer is ranging between 0.6 and 1.5.

In an embodiment of the (meth)acrylate adhesive composition of the present invention, the weight ratio of the silane compound to the hydroxyl (meth)acrylate monomer is ranging between 2 and 25.

In an embodiment of the (meth)acrylate adhesive composition of the present invention, the weight-average molecular weight of the reactive siloxane copolymer is ranging between 60,000 and 160,000.

In an embodiment of the (meth)acrylate adhesive composition of the present invention, the reactive siloxane copolymer comprises 0.05 to 1 weight percentage of hydroxyl functional groups.

In an embodiment of the (meth)acrylate adhesive composition of the present invention, the reactive siloxane copolymer can further comprise a chain transfer agent.

In an embodiment of the (meth)acrylate adhesive composition of the present invention, the (meth)acrylate polymer comprises a (meth)acrylate monomer and a cross-linkable monomer.

In an embodiment of the (meth)acrylate adhesive composition of the present invention, the amount of the (meth) acrylate monomer is ranging between 94 to 99.5 weight percent of the total amount of the (meth)acrylate monomer and the cross-linkable monomer.

In an embodiment of the (meth)acrylate adhesive composition of the present invention, the amount of the cross-linkable monomer is ranging between 0.5 to 6 weight percent of the total amount of the (meth)acrylate monomer and the cross-linkable monomer.

In an embodiment of the (meth)acrylate adhesive composition of the present invention, the weight-average molecular weight of the (meth)acrylate polymer is ranging between 800,00 and 2,000,000.

The present (meth)acrylate adhesive composition can provide an enhanced adhesion and weather resistance, also an enhanced stability over time and storage stability, when be used in polarizer bonding, can show a satisfied adhesion reliability and a proper rework ability.

The above and other aspects of the invention will become better understood with regard to the following detailed description of the preferred but non-limiting embodiment(s). These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be affected without departing from the spirit and scope of the novel concepts of the disclosure.

DETAILED DESCRIPTION OF THE INVENTION

In the following detailed description, for purposes of explanation, numerous specific details are set forth in order to provide a thorough understanding of the disclosed embodiments. It will be apparent, however, that one or more embodiments may be practiced without these specific details.

It is apparent that departures from specific designs and methods described and shown will suggest themselves to those skilled in the art and may be used without departing from the spirit and scope of the invention. The present invention is not restricted to the particular constructions described and illustrated, but should be construed to cohere with all modifications that may fall within the scope of the appended claims.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

The term "(meth)acrylic acid" used herein refers to acrylic acid or methacrylic acid, the term "(meth)acrylate" used herein refers to acrylate or methacrylate, and the term "(meth)acrylamide" used herein refers to acrylamide or methacrylamide.

The present invention is to provide a (meth)acrylate adhesive composition, comprising a (meth)acrylate polymer, a cross-linking agent and a reactive siloxane copolymer, wherein the acid value of the (meth)acrylate polymer is between 0 and 15 mgKOH/g, and the reactive siloxane copolymer is derived from the copolymerization of a silane compound represented by the following formula (I), a non-hydroxyl acrylate monomer containing $C_1$-$C_4$ alkyl group and a hydroxyl (meth)acrylate monomer and the use amount of the reactive siloxane copolymer is between 0.1 parts to 6 parts by weight per hundred parts by weight of the (meth) acrylate polymer:

$$X—R^1—SiR^2{}_{3-a}(OR^3)_a \qquad (I)$$

wherein X is an acryl group or a (methyl)acryloxy group, $R^1$ is a $C_1$-$C_8$ alkyl group or alkoxy group, $R^2$ and $R^3$ respectively are $C_1$-$C_4$ alkyl groups, and a is an integer between 1 to 3.

In the (meth)acrylate adhesive composition disclosed in the present invention, the reactive siloxane copolymer has compatible polarity with the (meth)acrylate polymer, and has both siloxane groups and hydroxyl groups. When the present (meth)acrylate adhesive composition applies to the polarizers for bonding to the display panel, because of the siloxane groups and hydroxyl groups of the reactive siloxane copolymer, the adhesion strength thereof can be enhanced due to the siloxane groups covalent-bonding to the substrate, and the adhesion strength thereof is without excessively rising up or declining due to the hydroxyl groups involving the overall cross-linking reaction of the adhesive composition to prevent the siloxane group from shifting to the bonding interface over time. The initial peel strength of the adhesive layer of the present (meth)acrylate adhesive composition is less change during the storage time and provides stability over time and storage stability. The present (meth) acrylate adhesive composition can provide an enhanced adhesion and weather resistance, also an enhanced stability over time and storage stability, when be used in polarizer bonding, can show a satisfied adhesion reliability and a proper rework ability.

In a preferred embodiment of present (meth)acrylate adhesive composition, from the viewpoint of polarity adjustment and the formation of the reaction with aforementioned both-end reactive structure the reactive siloxane copolymer is derived from a copolymerization of 5 to 30 parts by weight of a silane compound represented by the following formula (I), 80 to 120 parts by weight of a non-hydroxyl acrylate monomer containing $C_1$-$C_4$ alkyl group and 0.2 to 6 parts by weight of a hydroxyl (meth)acrylate monomer:

$$X—R^1—SiR^2{}_{3-a}(OR^3)_a \qquad (I)$$

Preferably, the reactive siloxane copolymer is derived from a copolymerization of 10 to 25 parts by weight of a silane compound represented by the formula: $X—R^1—SiR^2{}_{3-a}(OR^3)_a$ (I), 90 to 110 parts by weight of a non-hydroxyl acrylate monomer containing $C_1$-$C_4$ alkyl group and 0.5 to 5 parts by weight of a hydroxyl (meth)acrylate monomer.

The suitable hydroxyl (meth)acrylate monomer can be selected from those commonly used in the related art, such as, for example, but not limited to, 2-hydroxyethyl (meth)acrylate, 2-hydroxypropyl (meth)acrylate, 3-hydroxypropyl (meth)acrylate, 3-hydroxybutyl (meth)acrylate, 4-hydroxybutyl (meth)acrylate, the condensation products of the (meth)acrylic acid and glycidyl tertcarbonate or combinations thereof. In a preferred embodiment of present (meth) acrylate adhesive composition, the hydroxyl (meth)acrylate monomer is 2-hydroxyethyl methacrylate, 2-hydroxyethyl acrylate, 4-hydroxybutyl acrylate or the mixture thereof.

The non-hydroxyl acrylate monomer containing $C_1$-$C_4$ alkyl group disclosed in the present invention can comprises more than one of the acrylate monomer. In a preferred embodiment of the present invention, the non-hydroxyl acrylate monomer containing $C_1$-$C_4$ alkyl group comprises a butyl acrylate and an acrylate monomer selected from the group consisting of methyl acrylate, ethyl acrylate and propyl acrylate, the ratio of the amount of the butyl acrylate monomer to the acrylate monomers is ranging between 0.6 and 1.5. By selecting non-hydroxyl acrylate monomer containing $C_1$-$C_4$ alkyl group, the glass transition temperature of the (meth)acrylate adhesive composition disclosed in the present invention can be adjusted to be suitable to the laminating of functional optical films such as polarizers in optical displays.

In a preferred embodiment of the (meth)acrylate adhesive composition of the present invention, the weight ratio of the silane compound to the hydroxyl (meth)acrylate monomer is ranging between 2 and 25, preferably ranging between 4 and 20.

In a preferred embodiment of the (meth)acrylate adhesive composition of the present (meth)acrylate adhesive composition, the silicon atom in the silane compound represented by formula (I) is bonded to at least one alkoxy group (—$OR^3$), and is preferably bonded to one to three $C_1$-$C_4$ alkoxy groups. In a preferred embodiment of reactive siloxane copolymer disclosed in the present invention, the suitable silane compound is 3-(methacryloxy)propyltrimethoxysilane.

In a preferred embodiment of the present invention, the weight-average molecular weight of the reactive siloxane copolymer is ranging between 60,000 and 160,000.

In a preferred embodiment of the (meth)acrylate adhesive composition of the present invention, the reactive siloxane copolymer comprises 0.05 to 1 weight percentage and preferably comprises 0.1 to 0.7 weight percentage of hydroxyl functional groups. If the hydroxyl functional groups in the reactive siloxane copolymer is insufficient, the peel strength of the (meth)acrylate adhesive composition will move up or down over time significantly; if the hydroxyl functional groups in the reactive siloxane copolymer is excess, the cross-linking reaction will run too fast to shorten the operable time for process.

The method for preparing reactive siloxane copolymer of the present (meth)acrylate adhesive composition comprises the steps of dissolving the silane compound represented by formula (I), the non-hydroxyl acrylate monomer containing $C_1$-$C_4$ alkyl group and the hydroxyl (meth)acrylate monomer in a solvent under inert gas atmosphere and adding the initiator to trigger the polymerization.

The initiator suitable for preparing the present reactive siloxane copolymer can be those commonly used in the related art, such as, but not limited to, azo initiator, such as 2,2'-azobis (2-methylbutyronitrile), 2,2'-azobisisobutyronitrile, 2,2'-azobis(2,4-dimethylvaleronitrile), dimethyl-2,2'-azobis(2-methylpropionic acid) and the like, preferably 2,2'-azobisisobutyronitrile; and peroxide-based initiator, such as decanoyl peroxide, benzoyl peroxide, laurel peroxide or the like.

The solvents suitable for preparation of the present reactive siloxane copolymer can be the organic solvents commonly used in the related art, such as ethyl acetate, butyl acetate, methyl ethyl ketone, methyl isobutyl ketone, cyclohexanone, toluene or xylene or the like.

In another preferred embodiment of the (meth)acrylate adhesive composition of the present invention, the reactive siloxane copolymer can further comprise a chain transfer agent to control the molecular weight thereof. The chain transfer agent used in the present siloxane copolymer can be those commonly known in the related art, such as, aliphatic mercaptans, for example, n-dodecyl mercaptan, but not limited thereto.

The (meth)acrylate polymer of the present (meth)acrylate adhesive composition comprises a (meth)acrylate monomer and a cross-linkable monomer.

The suitable (meth)acrylate monomer of the present (meth)acrylate polymer can be the (meth)acrylate monomer containing linear, branched or cyclic $C_1$-$C_{12}$ alkyl group, alkoxy group or aryloxy group, such as methyl (meth)acrylate, ethyl (meth)acrylate, n-propyl (meth)acrylate, isopropyl (meth)acrylate, (meth)N-butyl acrylate, second butyl (meth)acrylate, third butyl (meth)acrylate, amyl (meth)acrylate, n-hexyl (meth)acrylate, cyclohexyl (meth)acrylate, 2-ethylhexyl (meth)acrylate, n-octyl (meth)acrylate, isooctyl (meth)acrylate, isononyl (meth)acrylate, lauryl (meth)acrylate, tetradecyl acrylate, cyclopentyl (meth)acrylate, cyclohexyl (meth)acrylate (meth), phenyl (meth)acrylate, phenoxyethyl acrylate, phenoxy (meth)acrylate propyl acrylate, phenoxybutyl (meth)acrylate, phenoxydiethylene glycol (meth)acrylate, 2-hydroxy-3-phenoxypropyl (meth)acrylate, (meth)cresyl acrylate, polystyrene (meth)acrylate or the combination thereof. The amount of the (meth)acrylate monomer is ranging between 94 to 99.5 weight percent of the total amount of the (meth)acrylate monomer and the cross-linkable monomer.

The cross-linkable monomer suitable for the (meth)acrylate polymer used in the present (meth)acrylate adhesive composition can be the monomer containing carboxylic acid group or hydroxyl group, such as, but not limited to, acrylic acid, (meth)acrylic acid, 2-hydroxyethyl (meth)acrylate, 3-hydroxypropyl (meth)acrylate, 4-hydroxybutyl (meth)acrylate, (meth)acrylic acid chloride 2-hydroxypropyl ester or the combination thereof, preferably 2-hydroxyethyl acrylate or 4-hydroxybutyl acrylate. The amount of the cross-linkable monomer is ranging between 0.5 to 6 weight percent of the total amount of the (meth)acrylate monomer and the cross-linkable monomer.

In an embodiment of the (meth)acrylate adhesive composition of the present invention, the (meth)acrylate polymer can be obtained by dissolving the acrylic monomer and the cross-linkable monomer in a solvent under inert gas atmosphere and adding the initiator to trigger the polymerization, wherein the initiator can be azobisisobutyronitrile, 2,2'-azobis(2,4-dimethylvaleronitrile), azobisisoheptonitrile, dimethyl-2,2'-azobis(2-methyl propionic acid), benzoyl peroxide, laurel peroxide or decanoyl peroxide; and the suitable solvent can be organic solvent, such as ethyl acetate, butyl acetate, methyl ethyl ketone, methyl isobutyl ketone, cyclohexanone, toluene, xylene or the like.

The weight-average molecular weight of the present (meth)acrylate polymer can be ranging between 80,000 to 2,000,000 and preferably ranging between 1,000,000 to 1,800,000. If the weight-average molecular weight of the (meth)acrylate polymer is low, the weather resistance of the (meth)acrylate adhesive composition will be insufficient; if the weight-average molecular weight of the (meth)acrylate polymer is excessive, the operability of the (meth)acrylate adhesive composition may be deficient.

The cross-linking agent used in the present (meth)acrylate polymer can be isocyanate compounds, amine compounds, epoxy compounds, metal chelate compounds or the combination thereof. The suitable isocyanate-based cross-linking agent can be, such as, toluene diisocyanate and trimer thereof, hydrogenated toluene diisocyanate, toluene diisocyanate adduct of trimethylolpropane, xylylene diisocyanate of trimethylolpropane adducts, trimethylene methane triisocyanate, isophorone diisocyanate, diphenylmethane diisocyanate, hexamethylene diisocyanate, m-xylylene diisocyanate, 1,3-bis(methyl isocyanate)cyclohexane, 4,4'-diisocyanate dihexylmethane or the like; the suitable amine-based cross-linking agent can be, such as, hexamethylene diamine, polyethyleneimine, hexamethylene tetramine, diethylene ethylenetriamine, ethylenetetramine, isophorone diamine, amine-based resin or melamine resin; the suitable epoxy-based cross-linking agent can be, such as, ethylene glycol diglycidyl ether, polyethylene glycol diglycidyl ether, glycerol diglycidyl ether, glycerol triglycidyl ether, 1,6-hexanediol diglycidyl ether, trimethylolpropane triglycidyl ether, diglycidyl aniline, diglycidyl amine, N,N,N',N'-tetraglycidyl-m-xylene diamine, bisphenol F diglycidyl ether or 1,3-bis(N,N'-Diglycidylaminomethyl)cyclohexane; the suitable metal chelate cross-linking agent can be, such as, but not limited to, the polyvalent metal chelates that formed from acetylacetone and aluminum, iron, copper, zinc, tin, titanium, zirconium or magnesium.

In an embodiment of the present invention, the amount of the cross-linking agent is ranging between 0.1 to 3.0 weight percent and preferably ranging between 0.5 to 2.5 weight percent of the (meth)acrylate polymer. If the amount of the cross-linking agent of the (meth)acrylate polymer is insufficient or excessive, the cross-link of the (meth)acrylate adhesive composition may be unsatisfied.

In an embodiment of the present invention, the (meth)acrylate polymer and the reactive siloxane copolymer are polymerized in a solvent in the presence of a cross-linking agent. The suitable solvents for the polymerization reaction can be organic solvents, such as, but not limited to, methyl ethyl ketone, acetone, acetylacetone, ethyl acetate, tetrahydrofuran, cyclohexanone, n-hexane, toluene, xylene or the combinations thereof.

The present (meth)acrylate adhesive composition can further comprises a silane coupling agent to adjust the adhesion thereof, for example, a silicon compound containing epoxy structure, such as 3-glycidoxypropyltrimethoxysilane, 3-glycidoxypropyltriethoxysilane, 2-(3,4-epoxycyclohexyl)ethyltrimethoxysilane or the like.

The present (meth)acrylate adhesive composition can further comprises the additives commonly used in the related art optionally, such as antistatic agents, ultraviolet absorbers, antioxidants, plasticizers, fillers, colorant, pigment or the like.

The present (meth)acrylate adhesive composition can be applied to a substrate surface with desired thickness by the method such as, roll coating, comma coating, dip coating, spinning coating or slot-die coating, and the adhesive layer can be obtained after the coated substrate is dried and aged. When the adhesive layer is used for the lamination of the polarizer and the display panel, it can provide a satisfied adhesion reliability and a proper rework ability.

The present invention will be explained in further detail with reference to the examples. However, the present invention is not limited to these examples.

EXAMPLE

Preparation Example 1: Preparation of Reactive Siloxane Copolymer I 50 parts by weight of n-butyl acrylate, 50 parts by weight of methyl acrylate, 20 parts by weight of 3-(Methacryloxy)propyltrimethoxysilane (KBM-503, available from Shin-Etsu Chemical Co., Ltd., Japan), 1 part by weight of 4-hydroxybutyl acrylate and 78 parts by weight of methyl ethyl ketone were mixed and purged nitrogen to remove oxygen to form solution A. 0.36 parts by weight of azodiisoheptonitrile (AIBN) and 20 parts by weight of methyl ethyl ketone were mixed, heated to 85° C., and added to the solution A. After the reaction was completed, the solution A' of the reactive siloxane copolymer was obtained, which was a mixture of the reactive siloxane copolymer I and methyl ethyl ketone, wherein the reactive siloxane copolymer I comprises 0.0975 weight percentage of hydroxyl functional groups, and had a weight-average molecular weight of 75,900.

Preparation Example 2: Preparation of Reactive Siloxane Copolymer II 50 parts by weight of n-butyl acrylate, 50 parts by weight of methyl acrylate, 20 parts by weight of 3-(Methacryloxy)propyltrimethoxysilane (KBM-503), 5 part by weight of 2-hydroxyethyl methacrylate and 82 parts by weight of methyl ethyl ketone were mixed and purged nitrogen to remove oxygen to form solution B. 0.36 parts by weight of azodiisoheptonitrile (AIBN) and 20 parts by weight of methyl ethyl ketone were mixed, heated to 85° C., and added to the solution B. After the reaction was completed, the solution B' of the reactive siloxane copolymer was obtained, which was a mixture of the reactive siloxane copolymer II and methyl ethyl ketone, wherein the reactive siloxane copolymer II comprises 0.522 weight percentage of hydroxyl functional groups, and had a weight-average molecular weight of 152,000.

Example 1: Preparation of (Meth)Acrylate Adhesive Composition 63 parts by weight of n-butyl acrylate, 20 parts by weight of 2-phenoxyethyl acrylate, 15 parts by weight of methyl acrylate, 1.5 parts by weight of acrylic acid, 0.8 parts by weight of 2-hydroxyethyl methacrylate (2-HEMA) and 150 parts by weight of ethyl acetate were mixed and purged nitrogen to remove oxygen. After purging nitrogen for 0.5 hours, azobisisobutyronitrile (AIBN) of the amount of 0.065 parts by weight was added to the solution, and heated to 65° C. After the reaction was completed, the solution of the (meth)acrylate polymer was obtained, which was a mixture of the (meth)acrylate polymer and ethyl acetate, wherein the (meth)acrylate polymer had an acid value of 13.9 mgKOH/g and a weight-average molecular weight of 1,400,000.

The solution of the (meth)acrylate polymer was diluted with ethyl acetate to obtain a solution of the (meth)acrylate polymer with a solid content of 18%. 0.16 parts by weight of diisocyanate-trimethylolpropane (AD75, available from SAPICI SpA, Italy), 0.26 parts by weight of epoxy-based crosslinking agent (solution of Tetrad-C, solid content 2%, solvent: ethyl acetate, available from Mitsubishi Gas Chemical Company, Japan) and 0.36 parts by weight of the solution A' of the reactive siloxane copolymer were added to the 100 parts by weight of the solution of the (meth)acrylate polymer with a solid content of 18% and mixed evenly to obtain a (meth)acrylate adhesive composition.

The obtained (meth)acrylate adhesive composition was applied to a release film, and the coated film was dried at 95° C. to obtain an adhesive layer of the thickness of 25 μm. The adhesive layer was attached to one side surface of a polarizer, and after 5 days aging at room temperature, the initial peel strength, the stability of adhesion over time and weather resistance were determined in accordance with the measurement described hereinafter. The test results were shown in Table 1.

Example 2: Preparation of (Meth)Acrylate Adhesive Composition

The solution of the (meth)acrylate polymer with a solid content of 18% was prepared in the same manner as in Example 1. 0.16 parts by weight of diisocyanate-trimethylolpropane (AD75), 0.26 parts by weight of epoxy-based crosslinking agent (solution of Tetrad-C, solid content 2%, solvent: ethyl acetate) and 0.9 parts by weight of the solution A' of the reactive siloxane copolymer were added to the 100 parts by weight of the solution of the (meth)acrylate polymer with a solid content of 18% and mixed evenly to obtain a (meth)acrylate adhesive composition.

The obtained (meth)acrylate adhesive composition was made into an adhesive layer for a polarizer by the same manner as the Example 1, and the initial peel strength, the stability of adhesion over time and weather resistance of the adhesive layer were determined according to the test method of Example 1. The test results were shown in Table 1.

Example 3: Preparation of (Meth)Acrylate Adhesive Composition

The solution of (meth)acrylate polymer with a solid content of 18% was prepared in the same manner as in Example 1. 0.16 parts by weight of diisocyanate-trimethylolpropane (AD75), 0.26 parts by weight of epoxy-based crosslinking agent (solution of Tetrad-C, solid content 2%, solvent: ethyl acetate) and 1.8 parts by weight of the solution A' of the reactive siloxane copolymer were added to the 100 parts by weight of the solution of the (meth)acrylate polymer with a solid content of 18% and mixed evenly to obtain a (meth)acrylate adhesive composition.

The obtained (meth)acrylate adhesive composition was made into an adhesive layer for a polarizer by the same manner as the Example 1, and the initial peel strength, the stability of adhesion over time and weather resistance of the adhesive layer were determined according to the test method of Example 1. The test results were shown in Table 1.

Example 4: Preparation of (Meth)Acrylate Adhesive Composition 65 parts by weight of n-butyl acrylate, 20 parts by weight of 2-phenoxyethyl acrylate, 15 parts by weight of methyl acrylate, 0.5 parts by weight of acrylic acid, 1.5 parts by weight of 2-hydroxyethyl methacrylate and 141 parts by weight of ethyl acetate were mixed and purged nitrogen to remove oxygen. After purging nitrogen for 0.5 hours, azobisisobutyronitrile (AIBN) of the amount of 0.036 parts by weight was added to the solution, and heated to 78° C. When the reaction was completed, the solution of the (meth)acrylate polymer was obtained, was a mixture of the (meth)acrylate polymer and ethyl acetate, wherein the (meth)acrylate polymer had an acid value of 4.6 mgKOH/g and a weight-average molecular weight of 1,000,000.

The solution of the (meth)acrylate polymer was diluted with ethyl acetate to obtain a solution of the (meth)acrylate polymer with a solid content of 32.5%. 0.35 parts by weight of diisocyanate-trimethylolpropane (AD75), 0.26 parts by weight of epoxy-based crosslinking agent (solution of Tetrad-C, solid content 2%, solvent: ethyl acetate) and 0.163 parts by weight of the solution B' of the reactive siloxane copolymer were added to the 100 parts by weight of the solution of the (meth)acrylate polymer with a solid content of 32.5% and mixed evenly to obtain the (meth)acrylate adhesive composition.

The obtained (meth)acrylate adhesive composition was made into an adhesive layer for a polarizer by the same manner as the Example 1, and the initial peel strength, the stability of adhesion over time and weather resistance of the adhesive layer were determined according to the test method of Example 1. The test results were shown in Table 1.

Example 5: Preparation of (Meth)Acrylate Adhesive Composition

The solution of (meth)acrylate polymer with a solid content of 32.5% was prepared in the same manner as in Example 4. 0.35 parts by weight of diisocyanate-trimethylolpropane (AD75), 0.26 parts by weight of epoxy-based crosslinking agent (solution of Tetrad-C, solid content 2%, solvent: ethyl acetate) and 1.63 parts by weight of the solution B' of the reactive siloxane copolymer were added to the 100 parts by weight of the solution of the (meth)acrylate polymer with a solid content of 32.5% and mixed evenly to obtain the (meth)acrylate adhesive composition.

The obtained (meth)acrylate adhesive composition was made into an adhesive layer for a polarizer by the same manner as the Example 1, and the initial peel strength, the stability of adhesion over time and weather resistance of the adhesive layer were determined according to the test method of Example 1. The test results were shown in Table 1.

Example 6: Preparation of (Meth)Acrylate Adhesive Composition 60 parts by weight of n-butyl acrylate, 25 parts by weight of 2-phenoxyethyl acrylate, 15 parts by weight of methyl acrylate, 1 parts by weight of 4-hydroxybutyl acrylate and 140 parts by weight of ethyl acetate were mixed and purged nitrogen to remove oxygen. After purging nitrogen for 0.5 hours, benzyl peroxide (BPO) of the amount of 0.03 parts by weight was added to the solution, and heated to 64° C. When the reaction was completed, the solution of the (meth)acrylate polymer was obtained, was a mixture of the (meth)acrylate polymer and ethyl acetate, wherein the (meth)acrylate polymer had an acid value of 0 mgKOH/g and a weight-average molecular weight of 1,800,000.

The solution of the (meth)acrylate polymer was diluted with ethyl acetate to obtain a solution of the (meth)acrylate polymer with a solid content of 13.5%. 0.1 parts by weight of isocyanate-based crosslinking agent (D262, available from Mistui Chemicals, Inc., Japan) and 0.0675 parts by weight of the solution B' of the reactive siloxane copolymer were added to the 100 parts by weight of the solution of the (meth)acrylate polymer with a solid content of 13.5% and mixed evenly to obtain the (meth)acrylate adhesive composition.

The obtained (meth)acrylate adhesive composition was made into an adhesive layer for a polarizer by the same manner as the Example 1, and the initial peel strength, the stability of adhesion over time and weather resistance of the adhesive layer were determined according to the test method of Example 1. The test results were shown in Table 1.

Initial peel strength measurement: The polarizer with adhesive layer was cut into a size of 25 mm×200 mm and adhered to a glass substrate by rolling with a 5 kg roller after removing the release film thereon. After 20 minutes, the initial peel strength was measured according to the test method of JIS Z0237 by a tension machine at a tensile speed of 300 mm/min and an angle of 180.

Stability of Adhesion Over Time

The stability of adhesion over time: At 23° C. of temperature and 50% RH of humidity, the polarizer with adhesive layer was cut into a size of 25 mm×200 mm and adhered to a glass substrate by rolling with a 5 kg roller after removing the release film thereon. After placing at a room temperature for 28 days, the peel strength of the adhesive layer was measured according to the test method of JIS Z0237, by a tension machine at a tensile speed of 300 mm/min and an angle of 180. If the difference between the peel strength over time and the initial peel strength was more than 50%, it was marked as "X", the difference was less than 50%, it was marked as "○".

The stability of initial peel strength over time: The polarizer with adhesive layer was placed at a room temperature for 30 days, after that, cut into a size of 25 mm×200 mm and adhered to a glass substrate by rolling with a 5 kg roller after removing the release film thereon and stand for 20 minutes. The initial peel strength over time of the adhesive layer was measured according to the test method of JIS Z 0237 by a tension machine at a tensile speed of 300 mm/min and an angle of 180. If the difference between the initial peel strength over time and the initial peel strength was more than 45%, it was marked as "X", the difference was less than 45%, it was marked as "○".

Weather resistance evaluation: The polarizer with adhesive layer was cut into a size of 312.4 mm×176.95 mm and attached to a glass substrate after removing the release film thereon, and placed at 60° C. and 90% RH of humidity for 500 hours or 80° C. for 500 hours. After that, the adhered polarizer was checked for any bonding failure on the glass substrate. If no bonding failure such as bubbling, peeling or cracking was found, it was marked as "○", if bonding failure such as bubbling, peeling or cracking was found, it was marked as "X".

TABLE 1

The test results of the (meth)acrylate adhesive composition obtained from Examples 1 to 6

|  | Example 1 | Example 2 | Example 3 | Example 4 | Example 5 | Example 6 |
|---|---|---|---|---|---|---|
| Initial Peel Strength (gf/25 mm) | 405 | 389 | 432 | 713 | 1190 | 300 |
| The Stability of Peel Strength Over Time | ○ | ○ | ○ | ○ | ○ | ○ |
| The Stability of Initial Peel Strength Over Time | ○ | ○ | ○ | ○ | ○ | ○ |
| Weather Resistance 60° C./90% RH | ○ | ○ | ○ | ○ | ○ | ○ |
| Weather Resistance 80° C. | ○ | ○ | ○ | ○ | ○ | ○ |

As shown in Table 1, the (meth)acrylate adhesive compositions of Examples 1 to 6 provided appropriate initial peel strength and weather resistance, and excellent stability of peel strength over time and stability of initial peel strength over time. Therefore, the present (meth)acrylate adhesive composition can be used in polarizer bonding for the adhesion thereof without overly increasing or declining over time to cause the decreased reworkability or the bonding failure, the present adhesive composition shows satisfied adhesion reliability and rework ability stability, and excellent weather resistance.

Although particular embodiments have been shown and described, it should be understood that the above discussion is not intended to limit the present invention to these embodiments. Persons skilled in the art will understand that various changes and modifications may be made without departing from the scope of the present invention as literally and equivalently covered by the following claims.

What is claimed is:

1. A (meth)acrylate adhesive composition, comprising:
   a (meth)acrylate polymer with an acid value of between 0 and 15 mgKOH/g;
   a cross-linking agent; and
   a reactive siloxane copolymer derived from the copolymerization of 5 to 30 parts by weight of a silane compound represented by the following formula (I), 80 to 120 parts by weight of a non-hydroxyl acrylate monomer containing $C_1$-$C_4$ alkyl group and 0.2 to 6 parts by weight of a hydroxyl (meth)acrylate monomer, wherein the use amount of the reactive siloxane copolymer is between 0.1 parts to 6 parts by weight per hundred parts by weight of the (meth)acrylate polymer:

$$X\text{—}R^1\text{—}SiR^2_{3-a}(OR^3)_a \quad (I)$$

wherein X is an acryl group or a (methyl)acryloxy group, $R^1$ is a $C_1$-$C_8$ alkyl group or alkoxy group, $R^2$ and $R^3$ respectively are $C_1$-$C_4$ alkyl groups, and a is an integer between 1 to 3.

2. The (meth)acrylate adhesive composition as claimed in claim 1, wherein the reactive siloxane copolymer is derived from a copolymerization of 10 to 25 parts by weight of a silane compound represented by the formula (I), 90 to 110 parts by weight of a non-hydroxyl acrylate monomer containing $C_1$-$C_4$ alkyl group and 0.5 to 5 parts by weight of a hydroxyl (meth)acrylate monomer.

3. The (meth)acrylate adhesive composition as claimed in claim 1, wherein the hydroxyl (meth)acrylate monomer is selected from one of the group consisting of 2-hydroxyethyl methacrylate, 2-hydroxyethyl acrylate and 4-hydroxybutyl acrylate, or combinations thereof.

4. The (meth)acrylate adhesive composition as claimed in claim 1, wherein the non-hydroxyl acrylate monomer containing $C_1$-$C_4$ alkyl group comprises a butyl acrylate monomer and an acrylate monomer selected from one of the group consisting of methyl acrylate, ethyl acrylate and propyl acrylate.

5. The (meth)acrylate adhesive composition as claimed in claim 4, wherein the ratio of the amount of the butyl acrylate monomer to the acrylate monomer is ranging between 0.6 and 1.5.

6. The (meth)acrylate adhesive composition as claimed in claim 1, wherein the weight ratio of the silane compound to the hydroxyl (meth)acrylate monomer is ranging between 2 and 25.

7. The (meth)acrylate adhesive composition as claimed in claim 1, wherein the weight-average molecular weight of the reactive siloxane copolymer is ranging between 60,000 and 160,000.

8. The (meth)acrylate adhesive composition as claimed in claim 1, wherein the reactive siloxane copolymer comprises 0.05 to 1 weight percentage of hydroxyl functional groups.

9. The (meth)acrylate adhesive composition as claimed in claim 1, wherein the (meth)acrylate polymer comprises a (meth)acrylate monomer and a cross-linkable monomer.

10. The (meth)acrylate adhesive composition as claimed in claim 9, wherein the amount of the (meth)acrylate monomers is ranging between 94 to 99.5 weight percent of the total amount of the (meth)acrylate monomer and the cross-linkable monomer.

11. The (meth)acrylate adhesive composition as claimed in claim 9, wherein the amount of the cross-linkable monomer is ranging between 0.5 to 6 weight percent of the total amount of the (meth)acrylate monomer and the cross-linkable monomer.

12. The (meth)acrylate adhesive composition as claimed in claim 1, wherein the weight-average molecular weight of the (meth)acrylate polymer is ranging between 800,00 and 2,000,000.

* * * * *